US005566728A

United States Patent [19]
Lange

[11] Patent Number: 5,566,728
[45] Date of Patent: Oct. 22, 1996

[54] METHOD AND APPARATUS FOR USE WITH INFLATABLE STOWAGE PADS FOR TRANSPORT PURPOSES

[75] Inventor: Guenter Lange, Gangelt, Germany

[73] Assignee: Spanset Inter AG, Oetwil am See, Switzerland

[21] Appl. No.: 296,165

[22] Filed: Aug. 29, 1994

[30] Foreign Application Priority Data

Oct. 22, 1993 [DE] Germany ............................ 9316201 U
May 9, 1994 [DE] Germany ........................ 44 16 312.6

[51] Int. Cl.⁶ .................... B65B 1/04; B65B 3/04
[52] U.S. Cl. ................ 141/10; 141/67; 141/68; 141/114; 141/313; 141/317; 239/526; 410/119
[58] Field of Search .................... 141/10, 67, 68, 141/114, 313, 317, 38, 349, 197; 410/119; 239/526, 318, DIG. 21; 417/187, 76, 178, 151; 406/38, 109, 151, 152; 128/205.13, 205.17, 205.24, 204.25; 5/61.5, 81.1, 453, 454, 910; 277/DIG. 1; 297/284.6, 452.41, DIG. 8, DIG. 9

[56] References Cited

U.S. PATENT DOCUMENTS

| | | | |
|---|---|---|---|
| 2,907,580 | 10/1959 | Tietig | 280/179 |
| 3,088,456 | 2/1960 | Stanton | 128/204.25 |
| 3,131,648 | 5/1964 | Seger | 410/119 |
| 3,199,689 | 8/1965 | Feldkamp | 214/10.5 |
| 3,414,140 | 12/1968 | Feldkamp | 105/369 |
| 3,427,997 | 2/1969 | Brown, Jr. et al. | 214/10.5 |
| 3,462,027 | 8/1969 | Puckhaber | 214/10.5 |
| 3,554,135 | 1/1971 | Duvall et al. | 105/369 |
| 3,556,318 | 1/1971 | Hollis | 214/10.5 |
| 3,667,625 | 6/1972 | Lucas | 214/10.5 D |
| 3,868,026 | 2/1975 | Baxter | 214/10.5 D |
| 3,877,393 | 4/1975 | Loomis et al. | 105/492 |
| 4,073,389 | 2/1978 | Angarola et al. | 214/10.5 D |
| 4,102,364 | 7/1978 | Leslie et al. | 141/4 |
| 4,306,665 | 12/1981 | Hickey | 220/232 |
| 5,454,407 | 10/1995 | Huza et al. | 141/10 |

FOREIGN PATENT DOCUMENTS

| | | |
|---|---|---|
| 2457232 | 12/1980 | France . |
| 1831978 | 1/1961 | Germany . |
| 1935482 | 8/1963 | Germany . |
| 1208875 | 1/1966 | Germany . |
| 1216198 | 5/1966 | Germany . |
| 1556068 | 9/1969 | Germany . |
| 2121793 | 11/1972 | Germany . |
| 2217889 | 10/1973 | Germany . |
| 2745904 | 5/1978 | Germany . |
| 8424614 | 12/1984 | Germany . |
| 8529227 | 3/1986 | Germany . |
| 2088806 | 6/1982 | United Kingdom . |

OTHER PUBLICATIONS

SpanSet Brochure, "Staupolster Die andere Dimension der Ladungssicherung; einfach, schnell, preiswert, extrem leicht und sicher", C 9201210, 4 pages.

Primary Examiner—Henry J. Recla
Assistant Examiner—Timothy L. Maust
Attorney, Agent, or Firm—Spencer & Frank

[57] ABSTRACT

A method for filling and evacuating an inflatable stowage pad, includes connecting the stowage pad to a nozzle apparatus including a handgrip which operates on the principle of a water jet pump for selectively generating a pressure air flow and a suction when connected to a source of compressed air. The stowage pad is selectively filled and evacuated with the nozzle apparatus.

10 Claims, 2 Drawing Sheets

5,566,728

METHOD AND APPARATUS FOR USE WITH INFLATABLE STOWAGE PADS FOR TRANSPORT PURPOSES

CROSS-REFERENCE TO RELATED APPLICATIONS

This application claims the right of foreign priority with respect to Utility Model Application G 93 16 201.4 filed in Germany on Oct. 22, 1993, and Patent Application P 44 16 312.6 filed in Germany on May 9, 1994, the disclosures of which are incorporated herein by reference.

FIELD OF THE INVENTION

The invention relates to a device with an operating handgrip for selectively generating a suction or pressure air flow by means of compressed air in accordance with the principle of a water jet pump for use with inflatable stowage pads for transport purposes. The invention further relates to a method for emptying an inflated stowage pad for transport purposes.

BACKGROUND OF THE INVENTION

The use of inflatable stowage pads for securing a load in a transport container is known. In such a process, stowage pads are inserted between individual articles in the load and are inflated. Due to the increase in the volume of the stowage pads, the articles in the load are braced in the transport container and therefore cannot slide or fall over during transport.

Stowage pads which are used in a freight car for such purposes are disclosed in U.S. Pat. No. 3,131,648. For this purpose, the cited patent teaches installation of a pressure line fixedly installed in the car to which the pressure pads are fixedly connected. On the one hand, the stowage pads can be supplied with compressed air for inflation via the pressure line installation and on the other hand they can be evacuated via an aspiration device which can be connected to the installation. This installation is elaborately constructed and is particularly suited for large transport containers only, for example railroad cars, where the installation of such an elaborate device is profitable.

Variable stowage pads for this purpose are disclosed, for example in the pamphlet "Spanset C 9201210". They are made of extremely sturdy and greatly expandable laminated paper with a polyethylene coating. The problem with such stowage pads does not reside in their application and insertion into the stowage position followed by inflation, in which they make secure transporting possible, but in their removal after the load securing process has been completed. This is conventionally accomplished by simply letting the air out through the filler valve or by destroying by cutting open the stowage pad (non-return solution). In both cases a pressure equalization between the interior and the surroundings of the stowage pad takes place, however, without the stowage pad essentially changing the shape that it had in the inflated state. It merely collapses slightly. The solid construction of the stowage pad prevents a reduction in volume and thus simple removal.

Elaborate installations, such as the one disclosed in U.S. Pat. No. 3,131,648, are too expensive for small trucks and cannot be operated there.

SUMMARY OF THE INVENTION

It is an object of the invention to provide a particularly simple method and apparatus by which inflatable stowage pads can be inflated and deflated with as little effort as possible.

The above and other objects are attained in accordance with the invention by the provision of a method for filling and evacuating a stowage pad, comprising: connecting the stowage pad to a nozzle apparatus including a handgrip which operates on the principle of a water jet pump for selectively generating a pressure air flow and a suction when connected to a source of compressed air; and selectively filling and evacuating the stowage pad with the nozzle apparatus.

According to another aspect of the invention there is provided a method for evacuating an air-filled stowage pad for transport purposes, comprising: creating a suction effect with the use of a compressed air flow at an opening; and connecting the opening with the interior of the stowage pad through a compressed air hose.

According to yet another aspect of the invention, there is provided a combination comprising an inflatable stowage pad for transport purposes and a compressed air-operated apparatus for inflating the stowage pad, wherein the compressed air-operated apparatus includes means for generating a suction flow for evacuating the stowage pad.

Starting with the concept of using an energy source which is relatively simple and already known, a compressed air-operated handgrip apparatus operating on the principle of a water jet pump is used for filling the stowage pad. The handgrip apparatus can additionally be reconfigured as an aspiration device, so that it is simultaneously suitable for filling and emptying the stowage pads.

A so-called "wonder pistol" is known from the prior art, which is also operated by compressed air and used for blowing and suction. However, it is designed for shop operations and is used on the one hand for blowing away dust and dirt and on the other for aspirating dust and dirt. In the suction mode the use of a dust bag at the outlet opening of the compressed air is mandatory for safety reasons. This not only hampers the air flow, but also makes the pistol hard to handle. Furthermore, the pistol has a relatively large suction opening, similar to that of a vacuum cleaner. Thus this pistol is completely unsuitable for stowage pads.

The method and apparatus according to the invention allow filling and evacuation of the stowage pads with the most simple of means and without employing elaborate or additional energy sources. Compressed air is generally available at loading and unloading stations or in transport vehicles, because of which use the compressed air-operated handgrip apparatus according to the invention is suitable for mobile employment.

Due to the special configuration of the handgrip apparatus according to the invention, the compressed air has a technically opposite effect in the emptying of the stowage pads. The emptying process of the stowage pads is considerably simplified by the method and the apparatus of the invention and permits repeated use of even simple paper stowage pads, because they are gently deflated and not destroyed. The suction effect generated by the handgrip apparatus and the method of the invention is comparatively gentle in comparison with an evacuating or pumping device, so that a violent evacuation of the stowage pad, which might lead to its destruction, is prevented. This gentle way of operating allows the repeated use of the stowage pads.

The handgrip apparatus advantageously has a connector which, together with a compressed air line, is embodied to fit the filler valve of the stowage pad. The handgrip apparatus is preferably embodied in the manner of a pistol. By means of this its ease of manipulation is further improved.

The invention and further advantages will be explained in detail below by means of exemplary embodiments and the drawings.

DETAILED DESCRIPTION OF THE PREFERRED EMBODIMENTS

Figure 1:
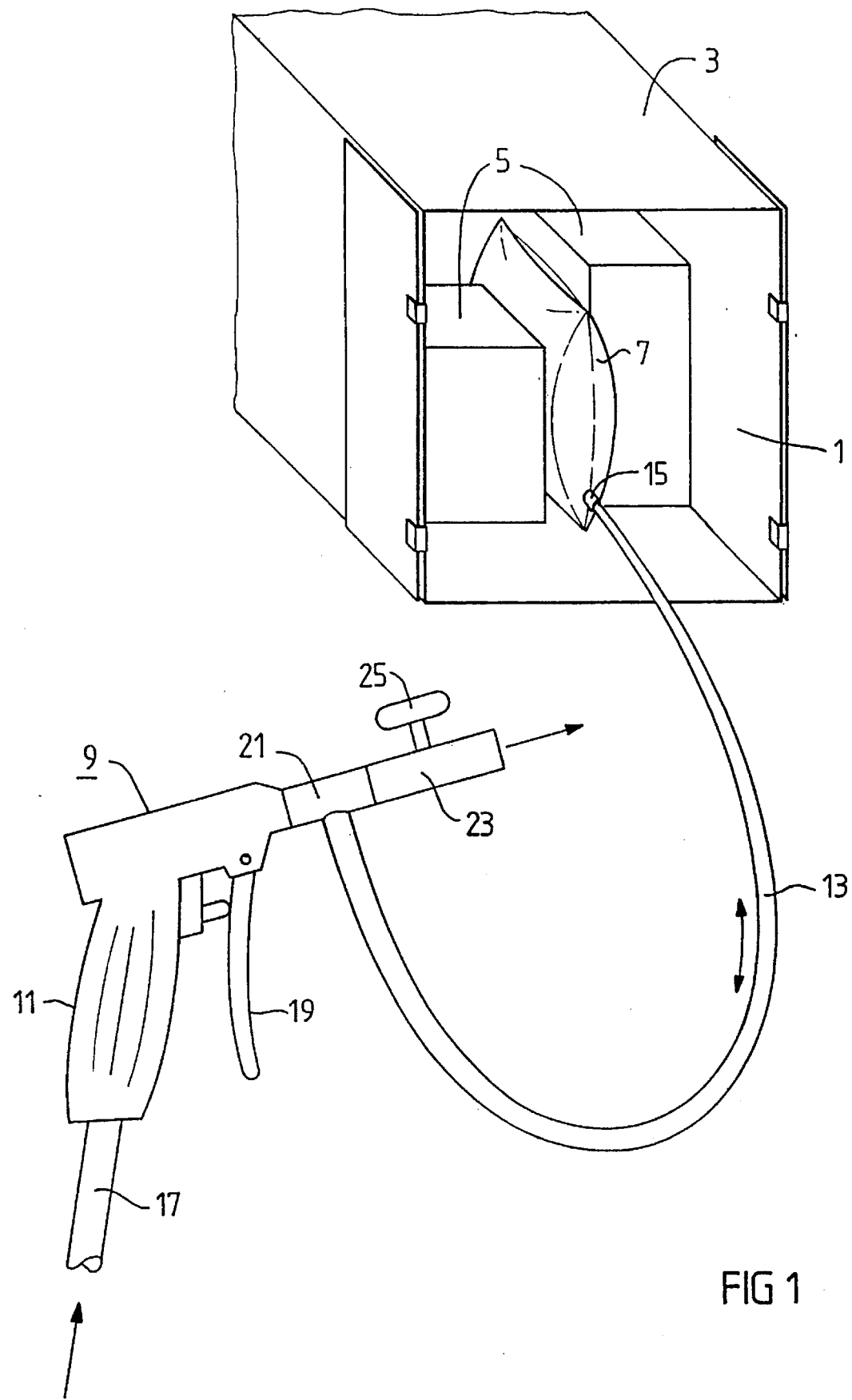
FIG. 1 is a schematic which shows the apparatus of the invention in use in a transport container.

Referring to FIG. 1, there is shown a partial view of a cargo compartment 1 of a transport container 3. Transport container 3 can be a container, the cargo space of a truck, a railroad car or any other suitable transport container, which may also be inside an aircraft or on a ship. By way of example, the instant transport container 3 is intended to be a part of a road vehicle. Boxes have been stowed in cargo compartment 1 as a load 5. To prevent the boxes from sliding during transport, an inflatable stowage pad 7 has been inserted between the boxes. Stowage pad 7 is inserted in an evacuated state, i.e. as a cover which is pressed flat, between cargo 5 to be secured, and is subsequently inflated.

Preferably, stowage pad 7 is made of multi-layered, extremely sturdy and highly expandable laminated paper which, if desired, has a polyethylene coating. In this manner the stowage pad 7 has a defined sturdiness in the airless state, so that it can be easily inserted between the cargo 5, even into narrow spaces, like a rigid cardboard layer.

To fix cargo 5 into place, stowage pad 7 is inflated to a preset operating pressure. This is done by means of a nozzle apparatus 9 which is essentially in the form of a pistol-shaped nozzle, having a handgrip 11, supplied with compressed air and being connected via a compressed air hose 13 to a connecting valve 15 of stowage pad 7. For this purpose, handgrip 11 is connected with a compressed air source, not shown in detail, via a supply hose 17. For actuation, handgrip 11 is operatively connected with a lever 19 which is operatively coupled with a valve (not shown) inside handgrip 11, by means of which the compressed air flow through handgrip 11 via hose 17 can be controlled.

Nozzle apparatus 9 can be embodied as a commercially available compressed air pistol, or simply as a manually operated nozzle. At its outlet side, nozzle apparatus 9 has a connector 21 to which compressed air hose 13 is connected. A further valve element 23 is connected to connector 21, via which it is possible to provide a connection from the interior of connector 21 to ambient air pressure by means of a valve handle 25.

Valve element 23 is in the closed position for filling or inflating stowage pad 7. If now lever 19 is actuated, the stowage pad 7 is filled with air via connector 21 and the compressed air hose 13. The compressed air flows directly into the opening of the compressed air hose 13. When the filled state has been reached, compressed air hose 13 can be removed from connector valve 15 and connector valve 15 can be closed. In this way cargo 5 is secure against sliding in a simple manner.

Stowage pad 7 must be removed for unloading. For this purpose the stowage pad must be deflated and decreased in size, for which first the connector valve 15 is opened. In this way a pressure equalization with the ambient air is created, but the volume of the stowage pad 7 is not essentially reduced thereby. If it were to be removed in this state it might possibly be torn or the load could slide or fall over. To reduce the volume of the stowage pad 7, it is necessary to evacuate additional air from it. For this purpose the already described nozzle apparatus 9 is used in an advantageous manner and with a new function and effect.

After connecting compressed air hose 13 with connector valve 15, valve element 23 is opened. Nozzle apparatus 9 is thus given a pumping or evacuation function which operates on the principle of a water jet pump. The compressed air exiting from valve element 23 generates an underpressure at the opening of the compressed air hose 13, and in this way in the compressed air hose 13 itself, which evacuates air from stowage pad 7. In this case evacuation of air is performed in a controlled manner and can be very sensitively metered by means of lever 19 so that careful evacuation of air from stowage pad 7 is possible and it is not damaged by the sudden evacuation of air. After the air has been evacuated from stowage pad 7, connector valve 15 of stowage pad 7 is closed again. Then the stowage pad 7 can be easily removed in the folded state from the space between the load 5.

The simple design of the nozzle apparatus 9 makes it possible to use handgrip 11 and lever 19, together with connector 21 and valve element 23 for inflating and deflating the stowage pad 7. In this case the structure of the nozzle apparatus 9 is particularly simple. In the simplest case it can be produced by simple adaptation of conventionally available means. The exhaust air advantageously moves out in a direction away from the operator.

The compressed air supply required for operating apparatus 9 can be present at a loading ramp, for example, or disposed on the transport vehicle itself. Compressed air supply devices are widespread as a rule, so that this energy source does not pose any problems for operating apparatus 9.

Figure 2:
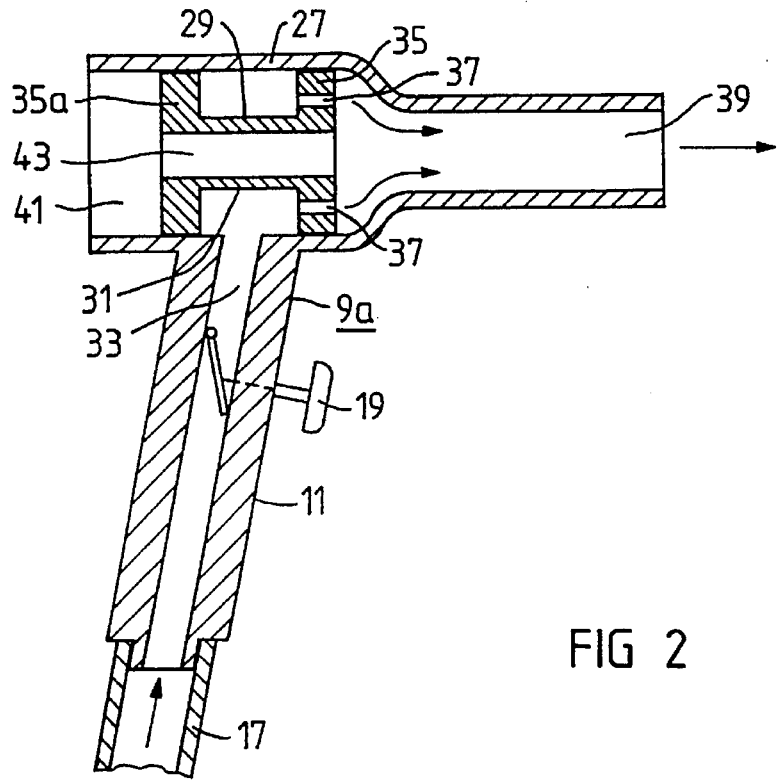
FIGS. 2 and 3 are sectional views of an alternative embodiment of the handgrip apparatus according to the invention in two operating modes, respectively.

FIG. 2 shows an alternative embodiment of a nozzle apparatus 9a embodied as a fill-suction pistol. This embodiment has a housing 27 with a nozzle insert 29, which in FIG. 2 is shown oriented in an inflating position. Nozzle insert 29 is embodied in the form of a coil body, having a circular recess 31 which forms a connection with a compressed air conduit 33 in handgrip 11. Openings 37 are provided in the one front wall 35 of nozzle insert 29. If lever 19a, which is coupled to a controllable valve 28 in conduit 33, is actuated in this position of nozzle insert 29, compressed air exits from the exit opening 39 via compressed air conduit 33 and recess 31 through openings 37. Exit opening 39 is embodied to be connected to compressed air hose 13, already described above, or for connection directly to connector valve 15.

Figure 3:
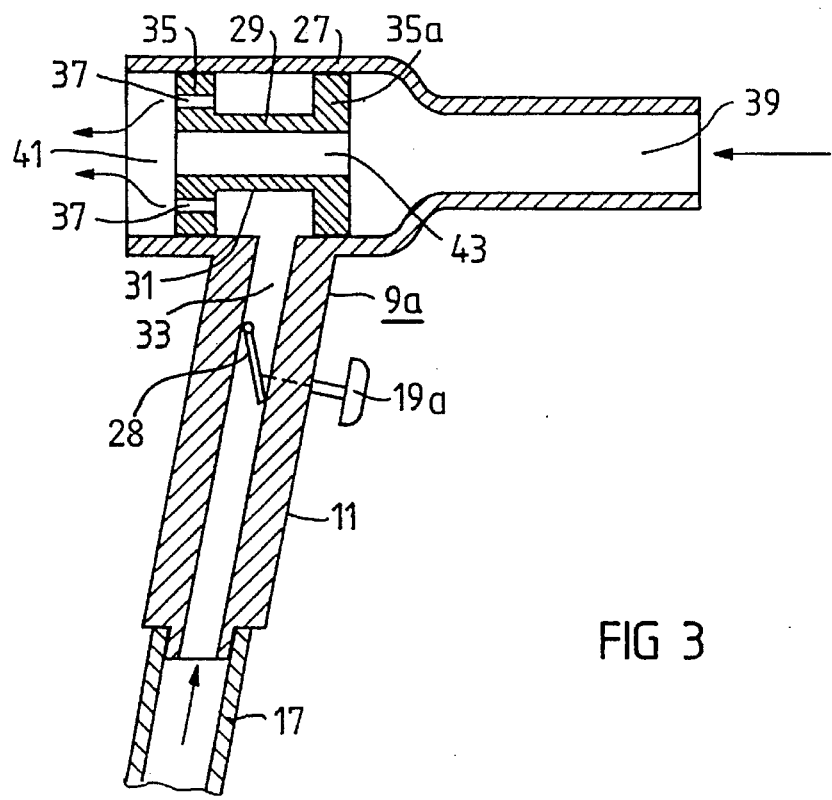

FIG. 3 shows nozzle apparatus 9a with insert 29 oriented in a suction mode. To assume this suction mode it is only necessary to reverse nozzle insert 29 with respect to its orientation in FIG. 2. Now the compressed air exits from the rear opening 41 of nozzle apparatus 9a via openings 37. The suction which aspirates air from the exit opening 39 is now at the center bore 43 of insert 29. This reversal of the function can be achieved by a simple reversal of the nozzle insert 29. It is of course conceivable in a further embodiment to cause the reversal of function by means of a lever, so that for example openings are made in both front walls 35 and 35a, depending on the function, whereby the desired air direction or function is provided.

The advantage of this process and of the associated apparatus lies in the rapidity of its operation and thus the rapid return of the stowage pads into an essentially flat, space-saving initial position in which the stowage pad, now in a flat shape, can be removed simply and without resistance and can be stored, particularly stacked, in a space-saving manner. Since manipulation is performed particularly gently, multiple use of the stowage pads is possible.

Because of its simple construction, the nozzle apparatus 9, 9a is particularly sturdy, and is thus especially suited for mobile employment in transport vehicles, since, as a rule, tools are subjected to great stresses there. All embodiments shown have a rigid design, because of which a long service life of nozzle apparatus 9, 9a is provided.

The embodiment in accordance with FIGS. 2 and 3 has a particularly advantageous air guidance, which operates with very small losses and assures a particularly good suction output. Its function is therefore particularly effective and good manipulation is provided by the pistol shape.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for filling and evacuating a stowage pad, comprising:

connecting the stowage pad to a nozzle apparatus including a handgrip which operates on the principle of a water jet pump for selectively generating a pressure air flow and a suction when connected to a source of compressed air; and selectively filling and evacuating the stowage pad with the nozzle apparatus.

2. A method for evacuating an air-filled stowage pad for transport purposes, comprising:

creating a suction effect with a use of a compressed air flow at an opening; and connecting the opening with the interior of the stowage pad through a compressed air hose.

3. A method in accordance with claim 2, and further comprising the step of inflating the stowage pad by rerouting the compressed air flow into the opening.

4. A method in accordance with claim 2, including providing mobile use of said method in a transport container of a transport medium.

5. A combination comprising an inflatable stowage pad for transport purposes and a compressed air-operated apparatus for inflating the stowage pad using compressed air, said compressed air-operated apparatus including means for generating a suction flow using the compressed air for evacuating the stowage pad.

6. The combination in accordance with claim 5, wherein said apparatus is adapted to operate in accordance with the water jet pump principle.

7. The combination in accordance with claim 5, wherein said apparatus includes a handgrip.

8. The combination in accordance with claim 5, wherein said apparatus comprises pistol-shaped nozzle.

9. The combination in accordance with claim 5, wherein said apparatus includes connection means for connecting with a stationary or transportable compressed air supply.

10. A combination in accordance with claim 5, wherein said apparatus includes an exit opening and said stowage pad includes a connector valve which is connectable to said exit opening by a compressed-air hose.

\* \* \* \* \*